(12) United States Patent
Koizumi

(10) Patent No.: US 6,700,563 B1
(45) Date of Patent: Mar. 2, 2004

(54) 3D ENCODER

(75) Inventor: David Koizumi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 324 days.

(21) Appl. No.: 09/676,027

(22) Filed: Sep. 29, 2000

(51) Int. Cl.⁷ .............................................. G09G 5/00
(52) U.S. Cl. ..................... 345/156; 700/118; 702/168
(58) Field of Search ................... 702/167, 168, 702/172; 700/264, 118, 119; 345/156

(56) References Cited

U.S. PATENT DOCUMENTS

| | | | |
|---|---|---|---|
| 2,042,606 A | 6/1936 | Kotowski | 252/511 |
| 2,949,674 A | 8/1960 | Wexler | 33/561.1 |
| 4,315,238 A | 2/1982 | Eventoff | 338/99 |
| 4,890,235 A * | 12/1989 | Reger et al. | 700/118 |
| 4,972,351 A * | 11/1990 | Reger et al. | 700/118 |
| 5,302,936 A | 4/1994 | Yaniger | 338/47 |
| 5,470,590 A * | 11/1995 | Brubaker et al. | 425/2 |
| 5,546,784 A | 8/1996 | Haas et al. | 72/413 |
| 5,796,620 A * | 8/1998 | Laskowski | 700/197 |
| 5,898,508 A | 4/1999 | Bekanich | 358/474 |
| 6,080,343 A * | 6/2000 | Kaufman et al. | 264/40.5 |
| 6,122,481 A | 9/2000 | Rusnack | 399/380 |
| 6,125,338 A | 9/2000 | Brienza et al. | 702/167 |
| 6,298,587 B1 * | 10/2001 | Vollom | 40/427 |
| 6,462,840 B1 * | 10/2002 | Kravtsov | 358/474 |

FOREIGN PATENT DOCUMENTS

| | | | |
|---|---|---|---|
| GB | 2352554 A * | 3/2001 | G01B/11/00 |
| JP | 408005357 A | 1/1996 | G01B/21/20 |
| JP | 2000288973 A * | 10/2000 | 15/21.2 |

OTHER PUBLICATIONS

Thompson/Derwent Translation JP8–5357–A of Minoura, JP 408005357A (Feb. 6, 1906), 1–22.*

* cited by examiner

*Primary Examiner*—Steven Saras
*Assistant Examiner*—Leland Jorgensen
(74) *Attorney, Agent, or Firm*—Marger Johnson & McCollom, P.C.

(57) ABSTRACT

A 3D encoder includes a body having several pin cavities. Several pins are also provided, wherein each pin is located within one of the pin cavities and wherein each pin is capable of sliding movement within its pin cavity. Each of the pins is capable of being displaced by contact with a surface of a 3D object to be encoded. A sensing mechanism is provided to determine an amount by which each of the pins is displaced due to contact between that pin and the surface of the 3D object. A computer can be used to translate displacement data into a 3D mapping representative of the 3D object being encoded. A method of creating a computerized representation of a 3D object is also provided and includes placing a 3D object in communication with a plurality of pins to deflect a position of each of the pins contacting the 3D object in an amount corresponding to a shape of a surface of the 3D object. An amount of displacement of each of the pins is then determined and computer data representative of the shape of the surface of the 3D object can be generated based on the displacement data.

23 Claims, 6 Drawing Sheets

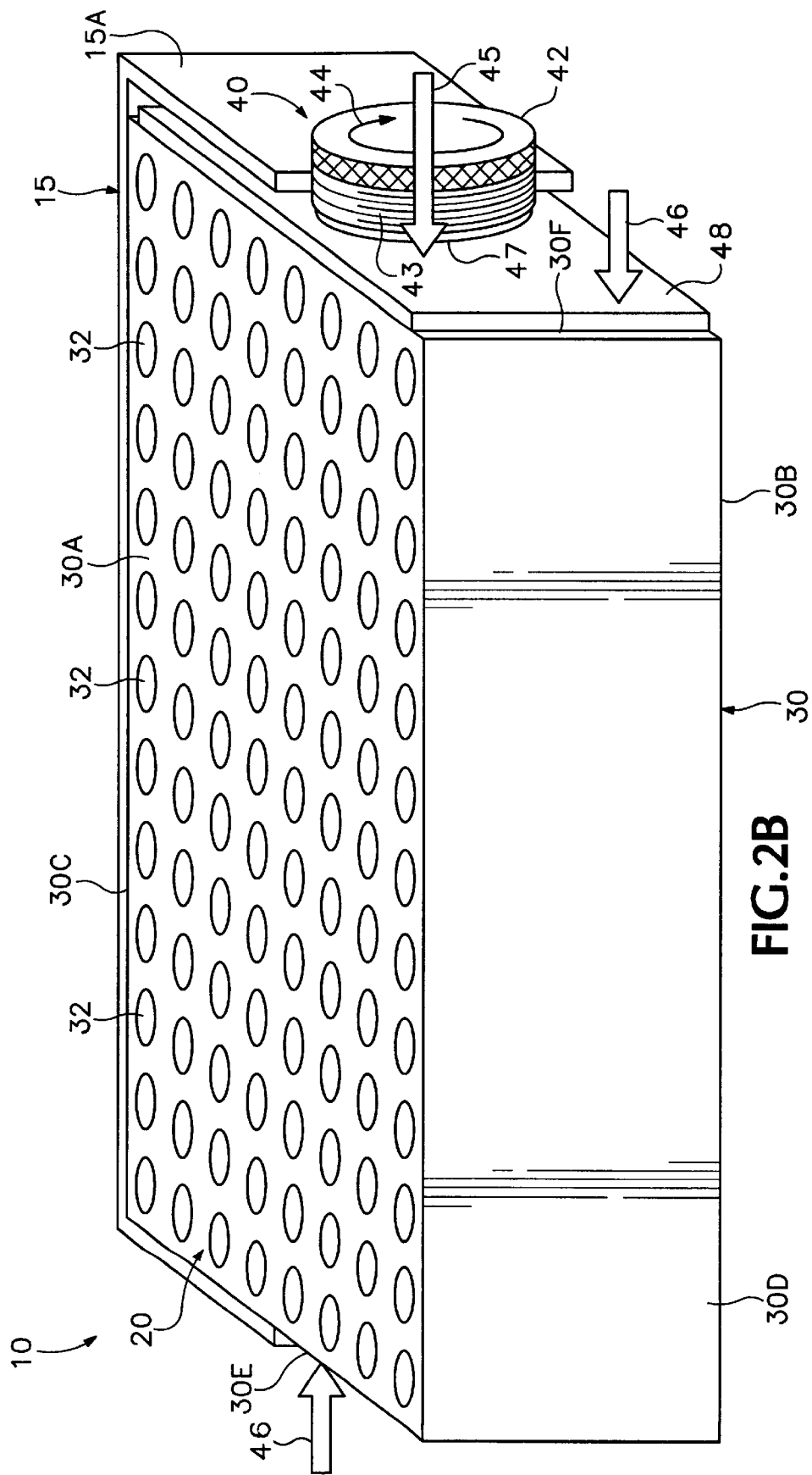

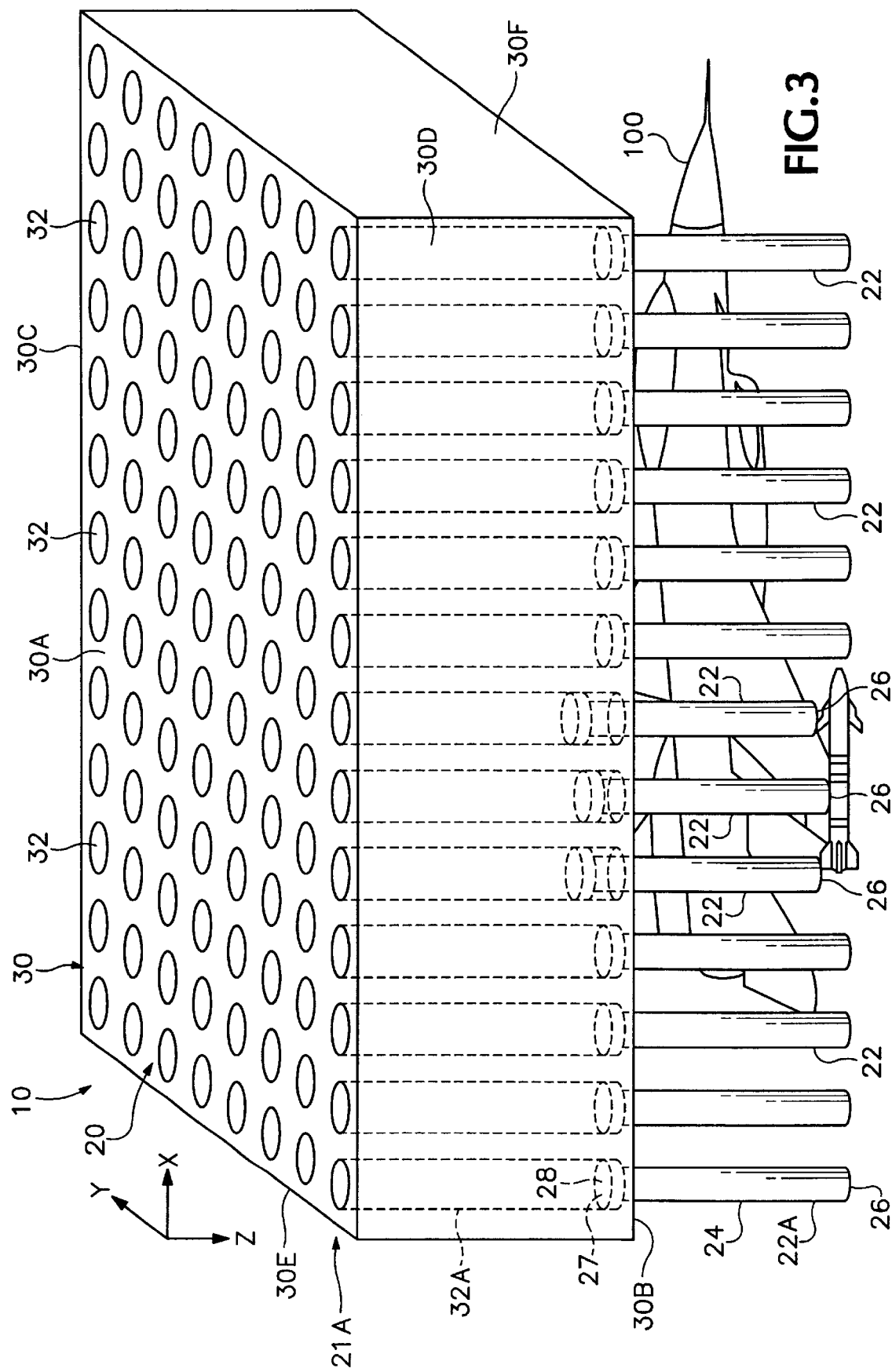

3D ENCODER

BACKGROUND OF THE INVENTION

This invention relates generally to devices and methods for capturing a topography of a three-dimensional (3D) object surface by sensing the physical surface arrangement and producing computer data representing that surface. More specifically, this invention relates to a 3D encoder and method of use.

The process of generating a 3D computer representation by sensing a surface configuration of a tangible 3D object is known as 3D object encoding. An encoding device is typically referred to as an encoder. Instrumented articulated arms are one type of conventional 3D encoders. These encoders have sensors for determining a spatial location of a pointer on an end of an articulated arm. In operation, the arm is positioned such that the pointer on the end of the arm contacts a 3D object at a sampling point along the object's surface. Data from the arm's sensors, indicating the location of the pointer, is sent to a computer. This sensor data is then translated by the computer into spatial (X, Y, and Z) coordinates of the 3D surface at the sampling point using complex computer software. The pointer is then moved to another point along the object surface and the coordinates corresponding to that point are obtained. This process is manually or automatically continued until a desired number of points along the surface of the object have been sampled.

After the desired number of points have been sampled, the X, Y, and Z coordinates from all of the sample points are combined using the computer software to create a 3D mapping of the object. The 3D mapping can be used to display a computerized image corresponding to the 3D object or to permit other desired use or manipulation of the data representing the 3D object. Although instrumented arm assemblies can produce a fairly accurate mapping, they require complex and expensive equipment and software and using them is difficult and time consuming.

A laser 3D encoder is another type of conventional 3D encoder. While laser 3D encoders are generally somewhat simpler to use than the instrumented articulated arm encoder described above, it is also generally more complex and expensive. When using a laser 3D encoder, a 3D object to be encoded is placed on a turntable of the device. A laser scans the surface of the object as the turntable rotates. Sensors detect the lasers as they are reflected from the object's surface and provide data to a computer regarding the contours of the scanned surface. A complex computer program then converts the sensor data into a computerized representation (i.e., a 3D mapping) of the object's surface.

BRIEF DESCRIPTION OF THE DRAWINGS

FIG. 2B is a somewhat schematic perspective view of the passive 3D encoder of FIG. 2A, having a portion of a frame thereof cutaway to show a compression mechanism according to one embodiment.

FIG. 3 is a somewhat schematic perspective view of the passive 3D encoder of FIG. 2A, shown without the frame and further showing a single row of pins and a 3D object to be encoded.

DETAILED DESCRIPTION

Figure 1:
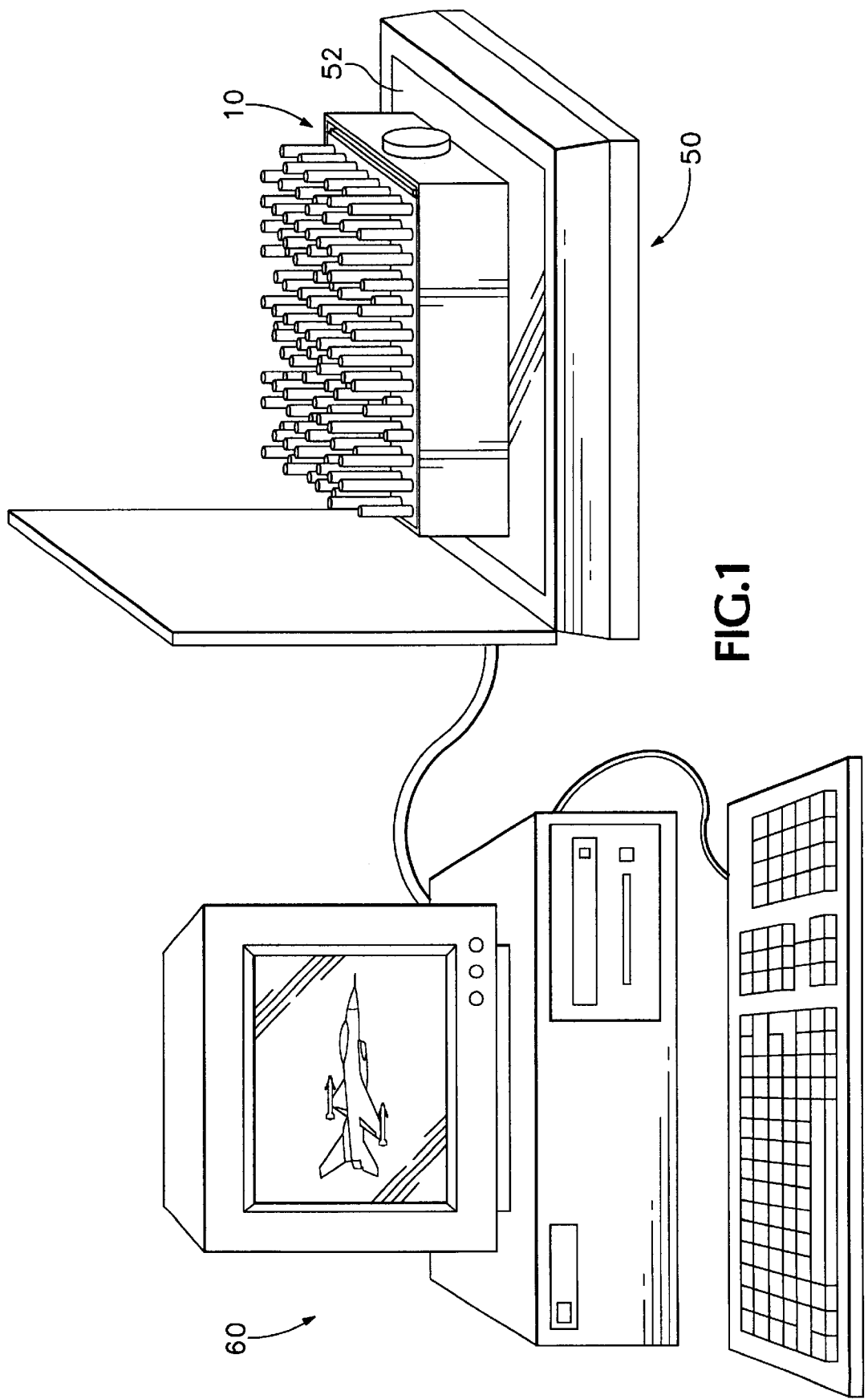
FIG. 1 is a schematic system level view illustrating the use of a 3D encoder in connection with a flatbed scanner and a personal computer according to one embodiment of this invention.

FIGS. 1–3 illustrate the general structure and operation of a passive 3D encoder according to a preferred embodiment of this invention. Referring to FIG. 1, an encoding system 8 creates a computer representation of a 3D object using a passive 3D encoder 10, a document scanner 50, and a personal computer 60. Referring collectively to FIGS. 1–3, the passive 3D encoder 10 creates a quick height or depth mapping of the 3D object 100 via the flatbed scanner 50 and the computer 60, using simple computer software.

Generally, according to the preferred embodiment, the passive 3D encoder 10 includes a body 30 having a pin array 20. The pin array 20 includes a plurality of pins 22 slidably mounted within pin cavities 32. In operation, each of the pins 22 in the array 20 is drawn by gravity into a fully extended position, but is displaced from that position by contact with a surface of a 3D object 100 to be encoded. The pins 22 are then locked into position using the compression mechanism 40 to prevent them from sliding while their displacement is being sensed.

Once the pins 22 are locked in place, the encoder 10 is inverted and placed on the scanner 50. The flatbed scanner 50 and computer 60 are then used determine an amount by which each of the pins 22 is displaced due to contact with the 3D object 100. Specifically, the scanner 50 detects an amount of light reflected from reflective ends 28 of each of the pins 22 and transmits the corresponding brightness data to the computer 60. The computer 60 receives the brightness data from the scanner 50 and translates it into displacement data that defines the shape of the surface of the 3D object 100 being encoded. The computer 60 then creates a 3D mapping of the surface using the displacement data.

Having generally described the construction and operation of the encoding system 8, a more detailed structural description of the 3D encoder 10 is provided here. Specifically, according to the preferred embodiment shown in FIGS. 1–5, the encoder 10 includes a rigid metal or plastic frame 15 having two end walls 15A, 15B and two side walls 15C, 15D. The frame 15 surrounds the body 30 of the 3D encoder 10. The body 30 is preferably made of a flexible black plastic block having a top surface 30A, a bottom surface 30B, two side walls 30C, 30D, and two end walls 30E, 30F.

A plurality of pin cavities 32 are formed transversely through the body 30 from the top surface 30A to the bottom surface 30B thereof in a Z direction. The pin cavities 32 are arranged in a pattern of rows and columns such that each of the pin cavities 32 is located at a unique X, Y position. A plurality of pins 22 is also provided, with each of the pins 22 disposed within one of the pin cavities 32. In this manner, the array of pins 20 is also arranged in a pattern of rows and columns disposed along an X, Y plane.

A configuration of each of the pins 22 will now be described with specific reference to pin 22A in row 21A of the encoder 10, as shown in FIG. 3. Referring specifically to FIG. 3, a pin 22A of the pin array 20 includes a rod 24, a contact end 26, and a scanning end 27. The rod 24 can be formed of metal or plastic and is slidably retained within a corresponding pin cavity 32A. The pin 22A is therefore capable of sliding movement in the Z direction within its respective pin cavity 32A. The scanning end 27 of each pin 22A is preferably arranged having a convex reflecting surface 28 on its head.

A convex reflecting surface 28 is desirable so that light projected onto the surface 28 the pin 22A through an opening of the cavity 32A will be reflected back in a plurality of directions. In this way, the convex reflective surface 28 reflects a greater amount of light toward the light absorbing walls the deeper it lies within the pin cavity 32A. Correspondingly, the deeper the pin 22A lies within the black walled cavity 32A of the body 30, the less the amount of light that will be reflected back through the opening of the cavity 32A. Accordingly, a brightness of the light reflected back out the cavity opening from the reflective surface 28 can be used as a measure of the depth of the pin 22A within the pin cavity 32A.

Figure 2A:
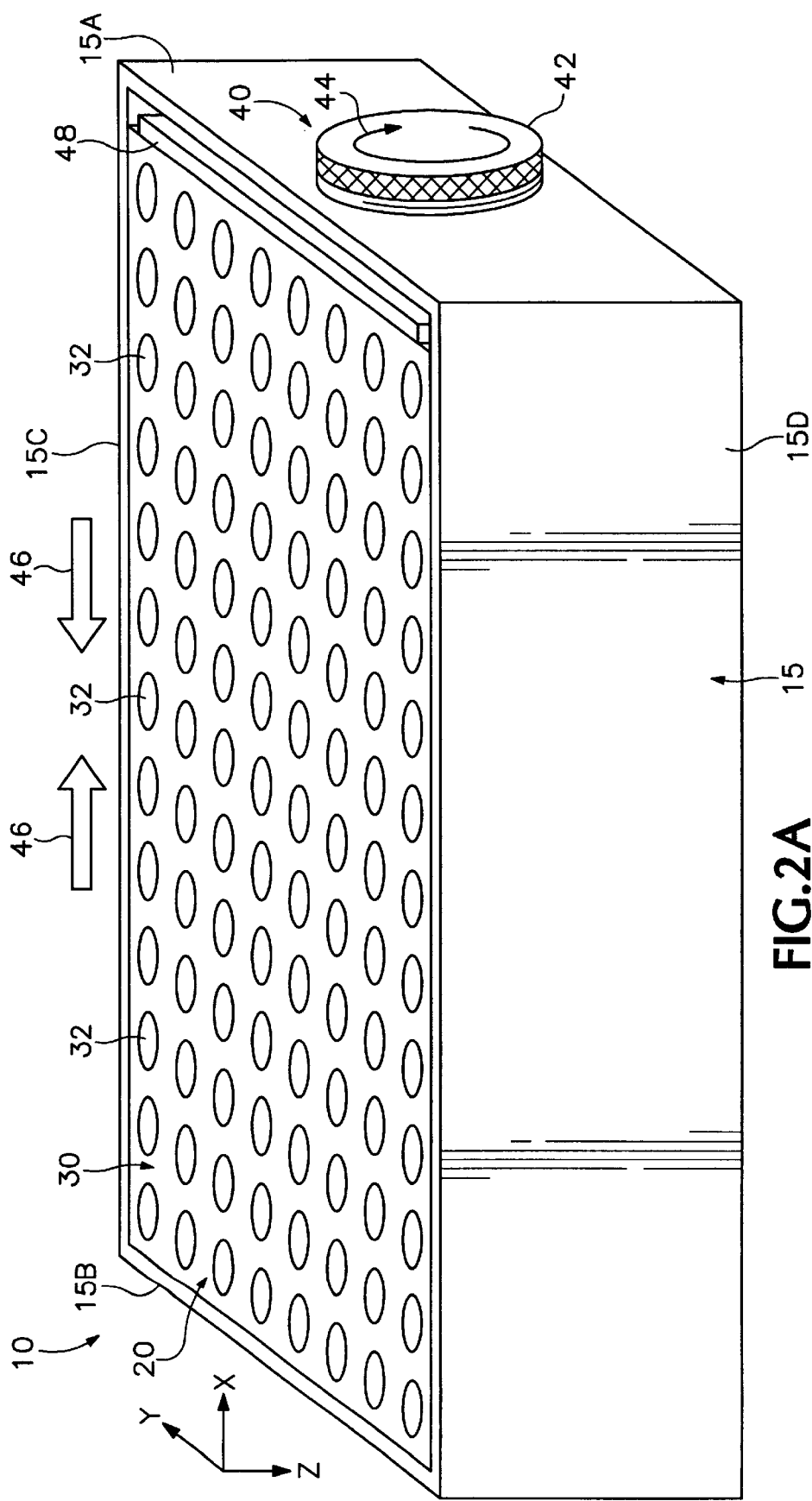
FIG. 2A is a somewhat schematic perspective view of a passive 3D encoder used in the system of FIG. 1, according to a preferred embodiment of the present invention.

Referring now to FIGS. 2A and 2B, the frame 15 includes a compression mechanism 40 that compresses the flexible plastic body 30 and deforms each of the pin cavities 32 to retain the pins 22 in their transverse positions within the cavities 32. The compression mechanism 40 includes an actuator knob 42 and a mechanical compression assembly. More specifically, the mechanical compression assembly includes a compression plate 48 made of a rigid metal or plastic material and mounted between an inside surface of the frame 15 and an outside surface of the body 30. In this embodiment, the compression plate is mounted between end wall 15A of the frame 15 and end wall 30F of the body 30. A threaded portion 43 of the actuator knob 42 is located within a threaded aperture of the frame 15 along end wall 15A. A contacting end 47 of the actuator knob 42 contacts the compression plate 48. Because it is formed of a rigid material, the compression plate 48 applies approximately equal force across substantially the entire width of the body 30 when operated.

Having described the structure of the preferred embodiment in detail, the operation of the invention according to a preferred embodiment thereof will now be described. Referring again to FIGS. 1–5, use of a passive 3D encoder 10, according to a preferred embodiment of this invention includes placing a 3D object 100 into contact with a pin array 20 of the passive 3D encoder 10. A contact end 26 of one or more of the pins 22 contacts the surface of the object 100. Each of the pins 22 that contact the object 100 are displaced according to the relative height of the object's surface at the point of contact. The compression mechanism 40 is then used to secure the pins 22 in their displaced positions. The encoder 10 is then inverted and placed on the flatbed scanner 50. The scanner 50 is operated to detect the relative brightness of reflections from the reflective ends 28 of the pins 22. Brightness data is transmitted from the scanner 50 to the computer 60. The computer 60 uses encoding software to convert the. brightness data into a Z coordinate value for each pin 22. The Z coordinate for each pin 22 is then used in combination with that pin's grid position (X, Y coordinates) to generate a computer mapping representative of the encoded surface of the 3D object 100.

More specifically, in operation, gravity causes all of the pins in a pin array 20 to fall to a position of maximum extension from their pin cavities 32. The encoder 10 is then placed over a 3D object 100 to be encoded. The surface of the 3D object 100 causes the pins 22 that contact the 3D object 100 to be displaced upwards from their fully extended positions by an amount corresponding to the elevation of the 3D object 100 at the point of contact. The pins 22 that do not contact the surface of the object 100 remain in their fully extended position. In other words, the depth of the pins 22 within their respective pin cavities 32, and hence their displacement from their fully extended positions, depends on the surface contours of the 3D object 100 being encoded.

Figure 4:
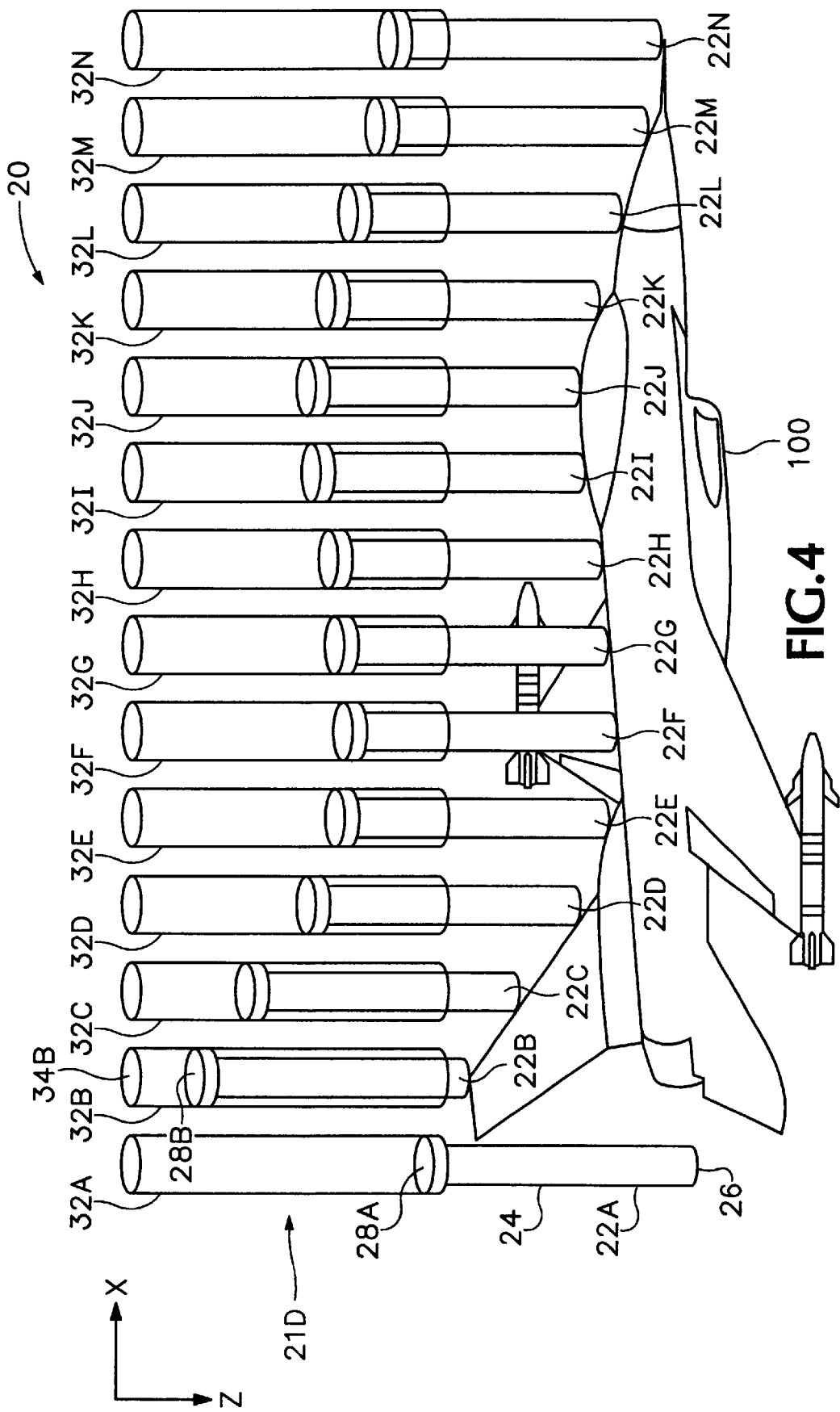
FIG. 4 is a somewhat schematic cross-sectional view of a row of pins and pin cavities of the passive 3D encoder of FIG. 2A, illustrating how the pins are used to encode a 3D object.
Figure 5:
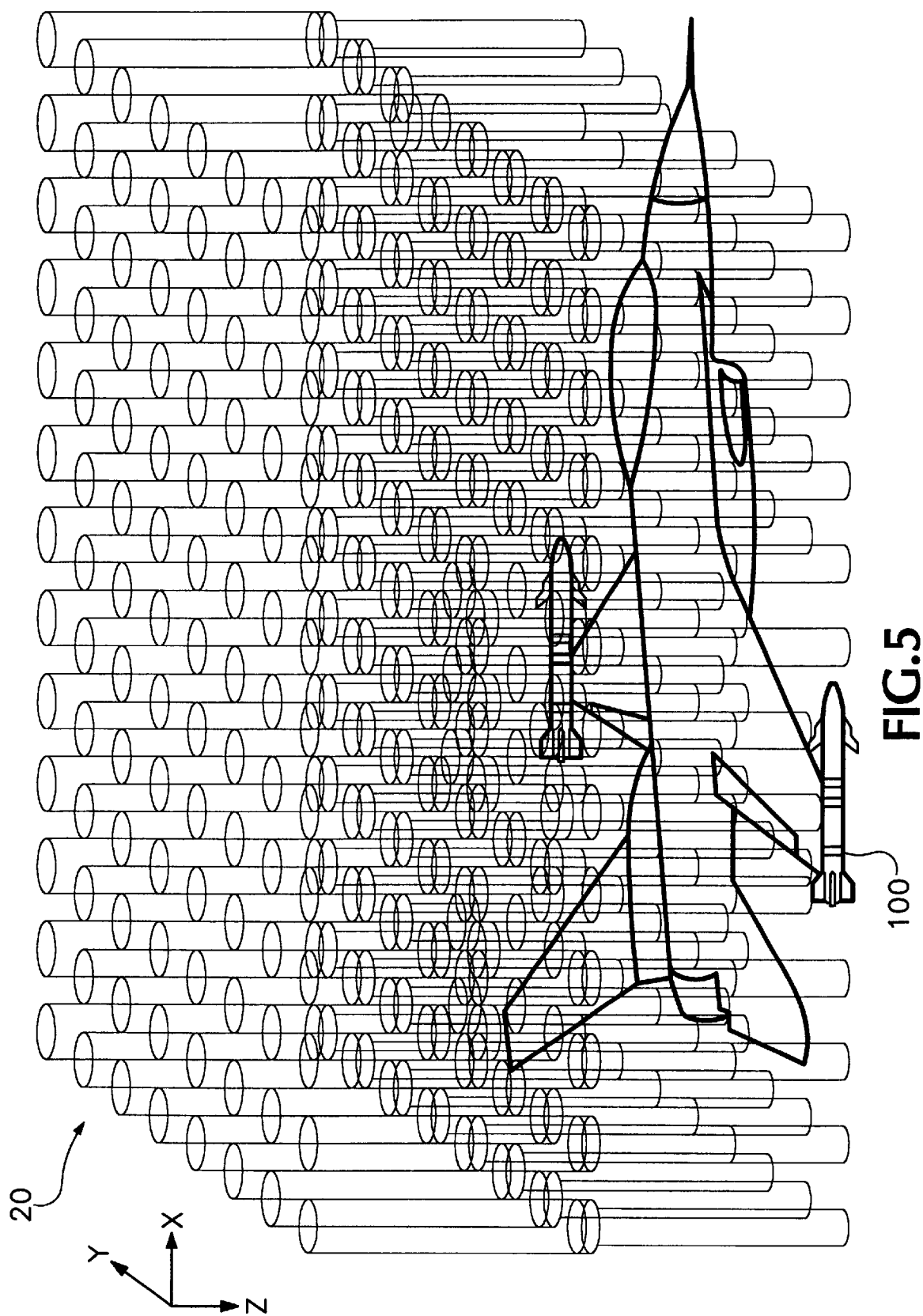
FIG. 5 is a wireframe perspective view of the pin array of the passive 3D encoder of FIG. 2A, illustrating use of a pin array to encode a 3D object.

Referring specifically to FIG. 4, for example, a first pin 22A in row 21D makes no contact with the 3D object 100 and is therefore drawn, by gravity, into its fully extended position. A second pin 22B in row 21D, however, contacts a substantially elevated point on the surface of the 3D object 100 and is therefore displaced substantially from its fully extended position. Similarly, the remaining pins 22C–22N in row 21D each contact the 3D object 100 at points having various elevations and they therefore have varying displacements based thereon.

While the pins 22 are displaced by the object 100, a locking mechanism is used to cause the pins 22 to be retained in their displaced positions. As illustrated in FIGS. 2A and 2B, the pins 22 are locked in place using the compression mechanism 40. Specifically, while the pins 22 are displaced, the user rotates the actuator knob 42 of the compression mechanism 40 in a clockwise direction, as indicated by arrow 44. As the knob 42 is rotated, the threaded portion of the actuator knob 42 is drawn through the threaded aperture in the end wall 15A of the frame 15 toward the end wall 30F of the body 30. The contacting end 47 of the actuator knob 42 thereby applies a force, indicated by arrow 45, on the compression plate 48, forcing it against the end wall 30F of the body 30. The further the actuator knob 42 is turned, the greater the force that it applies against the compression plate 48 and the greater the pressure that is applied by the compression plate 48 to the body 30. As pressure is applied by the compression plate 48 against the body 30, the body 30 is compressed between the compression plate 48 and the frame 15. This compression force, represented by arrows 46, causes the pin cavities 32 within the body 30 to deform slightly, thereby pinching the pins 22 within their pin cavities 32 and retaining them in their transverse positions within the cavities 32.

Once the pins 22 are locked in place, the user inverts the encoder 10 and places it on the scanner bed 52 of the scanner 50. Once the pin array 20 is in position on the scanner 50, the user then operates the scanner 50 to obtain brightness data from the pin array 20. The scanner 50 derives the brightness data from the pin locations of the encoder 10. The scanner 50 does this by reflecting and sensing a light off of the reflecting surface 28 of each pin 22. As noted above, the depth of each of the pins 22 within its corresponding one of the pin cavities 32 corresponds to an elevation of a sample point along the surface of the 3D object 100 being encoded. Accordingly, when scanned, the pattern of light created by the reflective surfaces 28 of the pins 22 corresponds to the surface topology of the 3D object 100. More specifically, as the depth of the reflective surface 28 of each pin 22 increases within its cavity 32, the brightness of the light reflected back to the scanner bed 52 decreases because the convex shape of the reflective surface 28 directs more of the light toward the absorptive black body 30.

Referring to row 21D, as shown in FIG. 4, for example, the amount of light reflected back to the scanner 50 from each of the pins 22A–22N depends on the depth of the pin 22A–22N within its pin cavity 32A–32N, as determined by the elevation of the 3D object 100. The lower the elevation of the 3D object 100 at the point of contact, the deeper the location of the pin 22 within the cavity, and the lesser the amount of light that will be reflected back to the scanner 50.

Specifically, the first pin 22A reflects very little light back to the scanner 50, because its reflective surface 28A is located at its deepest position within its pin cavity 32. The second pin 22B, however, reflects a relatively large amount of light back to the scanner 50, because its reflective surface 28B is located quite near to the opening 34B of its pin cavity 32B.

As noted above the light reflected back from the reflective surfaces 28 of the pins 22 to the scanner 50 is converted by the scanner 50 into brightness data. The scanner 50 sends the brightness data to the computer 60, which uses specially adapted encoding software to translate the brightness data from the scanner 50 into a computerized representation of the 3D object 100. Specifically, this specially adapted software enables the computer 60 to convert the brightness data into displacement data representative of the Z direction displacement of each of the pins 22. The displacement data is then used to create a 3D mapping (including X, Y, and Z coordinates at each sample point) of the scanned surface of the 3D object 100. In this manner, a scanner 50, a computer 60, and associated software can correlate relative brightness of pin reflections with pin depth and can transform pin depths into a computerized 3D representation of a 3D object surface.

Having described the structure and operation of a preferred embodiment of the invention, it should be apparent that many alternate forms of the invention are possible. A few of these alternative embodiments will now be discussed briefly. First, although the pin array 20 is preferably arranged in substantially aligned rows and columns, it could alternatively include staggered rows and columns to enhance the resolution of the resulting 3D image. Many other pin array configurations, which include pins arranged with each pin corresponding to a unique X, Y position, can also be used within the scope of the present invention. Secondly, although the compression mechanism 40 described with reference to FIGS. 2A and 2B is preferred, any other locking mechanism capable of locking the pins in their displaced positions is also within the contemplation of this invention.

In yet another potential embodiment, the sensing mechanism can include multiple displacement sensing resistors, or any other type of sensors, i.e. optical, etc., capable of measuring an amount of pin displacement. In this case, one sensor is provided for each pin 22 to measure the displacement thereof due to contact of the pin 22 with the 3D object 100. Displacement data from the sensors is sent to the computer 60. Any other type of sensing mechanism could also be used, as long as it can determine an amount of displacement of each of the pins and can communicate the displacement data to a computer 60. Regardless of the type of sensing mechanism used, the computer 60 uses software to translate the displacement data into a 3D mapping representative of the 3D object 100 being encoded.

An alternative embodiment of the invention will now be described briefly. According to an alternative embodiment of this invention, force sensing resistors or other types of displacement sensors can be used to detect an amount of pin displacement, in place of the light reflecting pin surfaces and scanner combination of the preferred embodiment. When this alternative form of displacement sensors are used, one sensor is used for each pin 22 in the pin array 20. The pin array 20 is placed in contact with the 3D object 100. The sensors directly measure an amount of displacement of each of the pins 22 according to the contact between the pin array 20 and the 3D object 100. This displacement data is sent to a computer and transformed into a 3D surface map of the object. Using this embodiment, no inversion of the encoder 10 is required and, therefore, no compression assembly is needed to lock the pins 22 in their displaced positions.

In addition, biasing mechanisms, such as springs, can be placed within each of the pin cavities 32 to bias each of the pins 22 in a position of maximum extension. Biasing the pins 22 in this manner can facilitate use of the invention in any position, without reliance upon, or concern for, the effects of gravity on the operation of the encoder 10. A button or trigger switch on the encoder 10 itself, or on the computer 60, can be provided to initiate obtaining the displacement data from the displacement sensors of the encoder 10.

Having described and illustrated the principles of the invention in a preferred embodiment and alternative embodiments thereof, it should be apparent that the invention can be modified in arrangement and detail without departing from such principles. I claim all modifications and variations coming within the spirit and scope of the following claims.

What is claimed is:

1. A 3D encoder, comprising:
   a body comprising a plurality of pin cavities, wherein said pin cavities comprise dark inner walls;
   a plurality of pins, each pin slideably mounted within one of the pin cavities, wherein each pin is capable of being displaced by contact with a surface of a 3D object to be encoded, each pin comprising a contact end and a reflective end;
   a light measuring mechanism configured to measure an amount of light reflected to the light measuring mechanism from the reflective ends of the pins, said amount of light reflected being proportional to an amount of displacement of each of the pins; and
   a processor configured to receive signals from the light measuring mechanism, said signals corresponding to the amount of light reflected from each of the pins, said processor further configured to convert said signals into measurements corresponding to an amount of displacement of the pins.

2. A passive 3D encoder according to claim 1, wherein the body is formed from flexible black plastic.

3. A passive 3D encoder according to claim 1, wherein the light measuring mechanism is a flatbed scanner.

4. A 3D encoder according to claim 1, wherein the processor comprises a computer arranged in electrical communication with the light measuring mechanism, said computer comprising instructions adapted to enable it to translate signals from the light sensing mechanism into a 3D mapping representative of the surface of the 3D object.

5. A computer readable medium comprising instructions adapted to enable a computer to interpret data from the displacement measuring mechanism of claim 1 to generate a computerized representation of the surface of the 3D object.

6. A 3D encoder according to claim 1, wherein the 3D encoder further comprises a frame and a pin locking mechanism, wherein the frame surrounds the body, wherein the pin locking mechanism comprises a compression mechanism adapted to compress the body against the frame, and wherein compression of the body compresses the pin cavities to prevent pin movement within the pin cavities.

7. A 3D encoder according to claim 6, wherein the compression mechanism comprises an actuator knob and a compression plate, said actuator knob configured to cause pressure to be exerted on the compression plate when operated to compress the body and lock the pins in place.

8. A 3D encoder according to claim 7, wherein the compression plate is configured to exert approximately equal force across substantially an entire width of the body.

9. A 3D encoder, comprising:
   a body comprising a plurality of pin cavities, wherein the pin cavities comprise walls formed from a light-absorbing material;
   a plurality of pins, each pin slideably mounted within one of the pin cavities, wherein each pin is capable of being displaced by contact with a surface of a 3D object to be encoded, each pin comprising a contact end and a reflective end;
   a light measuring mechanism configured to measure an amount of light reflected to the light measuring mechanism from the reflective ends of the pins, said amount of light reflected being proportional to an amount of displacement of each of the pins; and a processor configured to receive signals from the light measuring mechanism, said signals corresponding to the amount of light reflected from each of the pins, said processor further configured to convert said signals into measurements corresponding to an amount of displacement of the pins.

10. A 3D encoder according to claim 9, wherein the reflective ends of the pins each comprise a convex reflective surface, and wherein an amount of light reflected from the pin through an opening of its corresponding pin cavity is proportional to the amount of displacement of the pin.

11. An encoding system for enabling a computerized representation of a 3D object surface, said system comprising:
   an encoder comprising a frame and a body, said body being at least partially disposed in said frame and comprising a plurality of pin cavities having dark inner walls;
   a plurality of pins arranged in the pin cavities, each of said pins configured to be displaced by contact with the 3D object surface, each of,said pins further comprising a contact end and a reflective end; and
   a light sensing mechanism for detecting an amount of light reflected out of each of the pin cavities from the reflective ends of the pins, said amount of light reflected out of the pin cavities being proportional to a displacement of each of said pins resulting from contact with the surface of the 3D object.

12. A system according to claim 11, further comprising:
   a compression mechanism arranged on the frame to compress the body and deform the pin cavities.

13. A system according to claim 12, wherein the compression mechanism comprises an actuator knob and a compression plate, wherein actuation of the actuator knob causes the compression plate to exert a compression force on the body.

14. A 3D encoder according to claim 13, wherein the encoder further comprises a spring biasing mechanism in each of the pin cavities adapted to bias each of the pins towards a fully extended position.

15. A system according to claim 11, wherein the light sensing mechanism measures a brightness of the light reflected to the light sensing mechanism from the reflecting end of each of the pins, and wherein the brightness of the light reflected to the sensing mechanism from the pins is proportional to an amount of displacement of the pins.

16. A system according to claim 15, wherein the light sensing mechanism is a flatbed scanner electrically coupled to a computer, said computer comprising instructions for translating the brightness of the light reflected from each of the pins into displacement data.

17. A method of creating a computerized representation of a 3D object, the method comprising:
   placing a 3D object in communication with contact ends of plurality of pins arranged in pin cavities having dark inner walls to deflect a position of each of the pins contacting the 3D object in an amount corresponding to a height of a surface of the 3D object at a point of contact;
   measuring an amount of light reflected from reflective ends of the pins to determine an amount of displacement of each of the pins, wherein the amount of light reflected from the reflective ends of the pins is proportional to the amount of displacement of the pins; and
   generating data representative of the shape of the surface of the 3D object based on the amount of displacement of each of the pins.

18. A method of creating a computerized 3D representation according to claim 17, further comprising:
   translating the amount of displacement of each of the pins into a Z coordinate value for that pin; and
   using an X and a Y coordinate value for each of the pins in combination with the Z coordinate value for that pin in order to create a 3D mapping representative of the 3D object.

19. A method of creating a computerized 3D representation according to claim 17, wherein measuring an amount of light reflected from the reflective ends of the pins to determine an amount of displacement of each of the pins comprises using a flatbed scanner to sense a brightness of light reflected from each of the pins, and further comprises using a computer to translate the brightness of light into displacement data.

20. A method of creating a computerized 3D representation according to claim 19, further comprising maintaining the pins in their displaced positions by compressing a body having pin cavities that house the pins, while arranging the plurality of pins in operative relation with the flatbed scanner.

21. A method of creating a computerized 3D representation according to claim 20, wherein compressing the body having pin cavities that house the pins comprises applying an approximately equal force across substantially an entire width of the body.

22. A method of creating a computerized 3D representation according to claim 21, wherein applying an approximately equal force across substantially an entire width of the body comprises applying force to a rigid compression plate arranged in communication with substantially the entire width of the body.

23. A method of creating a computerized 3D representation according to claim 17, further comprising spring biasing the plurality of pins toward a fully extended position.

* * * * *

UNITED STATES PATENT AND TRADEMARK OFFICE
CERTIFICATE OF CORRECTION

PATENT NO. : 6,700,563 B1
DATED : March 2, 2004
INVENTOR(S) : Koizumi

It is certified that error appears in the above-identified patent and that said Letters Patent is hereby corrected as shown below:

Column 7,
Line 36, "each of,said pins" should read -- each of said pins --.

Signed and Sealed this

Third Day of May, 2005

JON W. DUDAS
*Director of the United States Patent and Trademark Office*